United States Patent [19]

Tamura et al.

[11] 4,446,905
[45] May 8, 1984

[54] RADIAL TIRES FOR RUNNING ON ROUGH GROUND

[75] Inventors: Akira Tamura; Yasuo Suzuki, both of Tokyo, Japan

[73] Assignee: Bridgestone Tire Company Limited, Tokyo, Japan

[21] Appl. No.: 315,797

[22] Filed: Oct. 28, 1981

[30] Foreign Application Priority Data

Nov. 6, 1980 [JP] Japan .................................. 55-155215

[51] Int. Cl.³ .............................................. B60C 9/20
[52] U.S. Cl. ......................... 152/361 DM; 152/361 R
[58] Field of Search ................. 152/361 DM, 361 FP, 152/361 R

[56] References Cited

U.S. PATENT DOCUMENTS

| | | | |
|---|---|---|---|
| 3,175,598 | 3/1965 | Cegnar | 152/361 R |
| 3,643,723 | 2/1972 | Mukai et al. | 152/361 DM |
| 3,656,533 | 4/1972 | Barassi et al. | 152/361 DM |
| 4,016,916 | 4/1977 | Ravagnani | 152/361 R |
| 4,161,203 | 7/1979 | Suzuki et al. | 152/361 DM |
| 4,172,487 | 10/1979 | Suzuki et al. | 152/361 DM |
| 4,286,645 | 9/1981 | Boileau | 152/361 R |

Primary Examiner—Edward C. Kimlin
Assistant Examiner—F. K. Wine
Attorney, Agent, or Firm—Sughrue, Mion, Zinn, Macpeak and Seas

[57] ABSTRACT

In pneumatic radial tires for running on rough ground, which are useful for applying to construction vehicles and provided with a tread reinforcing layer composed of a plurality of belts embedded in a crown portion of the tires, which surrounds a carcass composed of at least one cord layer arranged in radial plane of the tire, said tread reinforcing layer comprises a pair of main intersecting belts having different belt width in which cords are arranged so as to intersect with each other across an equator of the tire, and supplemental two belts arranged in the inside and outside of said pair of main intersecting belts respectively, in which cords have an elongation at breakage of at least 40% larger than that of the cords of the main intersecting belts, and an angle of the cords in the belt having the smaller width in the main intersecting belts with respect to the above described equator is 2°–9° smaller than the angle of the cords in the belt having the larger width and an angle of the cords of the supplemental belt positioning between the main intersecting belts and the carcass ply is 35°–60°.

4 Claims, 2 Drawing Figures

RADIAL TIRES FOR RUNNING ON ROUGH GROUND

BACKGROUND OF THE INVENTION

The present invention relates to the improvement of belt arrangment reinforcing the crown portion of radial tires which are usefully applied to construction vehicles for running on rough ground.

Heretofore, these pneumatic radial tires, when running over rough ground having projections, are apt to have cuts in the tread portion, separation in side edge of the belt, cut of the belt cords and other problems. When these breakdowns are large, such tires cannot immediately be used and even when these breakdowns are small, the cut grows by subsequent use and such tires cannot be used to the end of tread life. Prior techniques proposed for improving these defects include (1) uniformly varying the angle of the entire belts, (2) varying the direction of cords in each belt layer, (3) varying the width, embedded cord number and number of the belts and (4) varying the thickness from the groove bottom of tread to the belt and the like. However, any of these processes cannot obtain satisfactory effects. Because radial tires heretofore developed for improved roads have not been designed to consider partial and noticeable forced deformation due to the ground projects, which become the problem when radial tires are applied to running on the rough ground, the above described proposals are not useful. Consequently belt breakage in the tire, the separation of cord ends in the belt from the circumferential rubber and the cut damage at the tread portion owing to rock stones and the like cannot be prevented and these tires are not fit to use on rough roads. Among these problems, the separation resistance at the cord end of belt and the cut resistance at the tread portion need solutions that are the converse of each other and it has been difficult to accomplish both performance where running on rough ground is possible without causing tread cut and further the running at a high speed is possible.

The present invention concurrently improves the cut resistance of the tread, the penetration resistance of the tread, the break resistance of the belt cord and the separation resistance at the belt cord end of radial tires to be used for running on rough ground, and the combination of the properties which have been heretofore considered to be imcompatible.

It has been considered that the separation resistance at the tire crown portion is influenced by the strain and heat generation when the tire is repeatedly subjected to load deformation and the penetrating force of rock stones. In this case, the higher the speed, the larger the load, the larger the road surface roughness and the higher the thickness of the tread portion, the more severe are the conditions required for the tire.

On the other hand, the cut resistance and the penetration resistance in the tire crown portion and the break resistance of the belt cords are greatly influenced by the flexibility of the crown portion, the thickness of the tread portion and the strength of the belt. In this case, when the crown portion is made harder, the thickness of the tread portion is reduced and the strength of the belt is lower. Consequently, more severe conditions are required for the tires.

The inventors have studied various belt structures and have found belt structures of radial tires for running on rough ground which are flexibly deformed even when running on rough ground and hardly cut. Such belt structures are low in heat generation even being used at high speed and separation at the cord end is not significant.

SUMMARY OF THE INVENTION

The present invention relates to pneumatic radial tires for running on rough ground in which a carcass composed of at least one cord layer arranged in radial plane of the tire is surrounded with a tread reinforcing layer composed of a plurality of belts embedded in a crown portion of the tire. The tread reinforcing layer comprises a pair of main intersecting belts having different belt width in which cords are arranged to intersect with each other across an equator of the tire and supplemental belts are arranged in the inside and outside of said pair of main intersecting belts respectively. The cords of the supplemental belts have an elongation at breakage of the cords of at least 40% larger than that of the cords of the main intersecting belts. The angle of the cords in the belt having a smaller width in the main intersecting belts with respect to the above described equator is 2°–9° smaller than the angle of the cords in the belt having the larger width. The angle of the cords of the supplemental belt positioned between the main intersecting belts and the carcass ply is 35°–60°.

By using the supplemental belts which are arranged in the inside and outside of the main intersecting belts and in which the elongation at breakage of the cords in each belt is at least about 40%, preferably at least about 70% larger than that of the cords in the main intersecting belts, the flexibility of the entire belt is ensured so that cut resistance and penetration of the crown portions are improved and further the breakage of the cords in the belt layer and separation in the side edge of the belt can be effectively reduced. By making the angle of the cords in the supplemental belt positioned in the inside of the main intersecting belts with respect to the tire equator to be 35°–60°, particularly 40°–50°, the effect of the present invention can be more improved. The inventors have found that by making the angle of the cords in the belt having the smaller width in the main intersecting belts and arranged generally in the outside among these main intersecting belts, with respect to the tire equator to be 2°–9° smaller than the angle of the cords in the other belt having the larger width in the main intersecting belts, which is generally 15°–50°, that is the angle of the cords in the belt having the smaller width being 6°–48°, especially separation in the side edge of the belt can be more effectively reduced. When the angle of the cords in the inner belt positioning between the main intersecting belts and the carcass ply is 35°–60°, in the use at a high speed on a road the movement of the belt is prevented, whereby the durability against heat generation is obtained. When such tires are used for running on rough ground, they have flexibility capable of following to a certain deformation, whereby the separation resistance of the belt due to strain can be improved.

BRIEF DESCRIPTION OF THE DRAWINGS

The present invention will be explained in more detail.

For a better understanding of the invention, reference is taken to the accompanying drawings, wherein.

DESCRIPTION OF THE PREFERRED EMBODIMENTS

The following example is given for the purpose of illustration of this invention and is not intended as limitations thereof.

Figure 1:
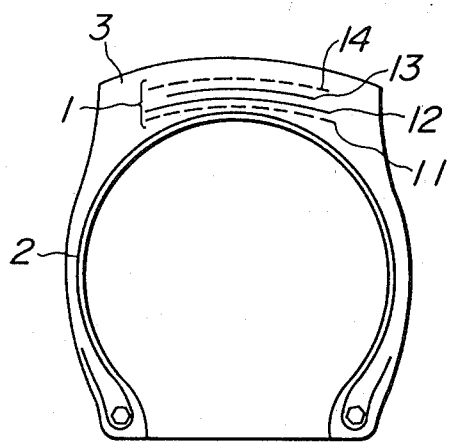
FIG. 1 is a cross-sectional view of a tire of the present invention.
Figure 2:
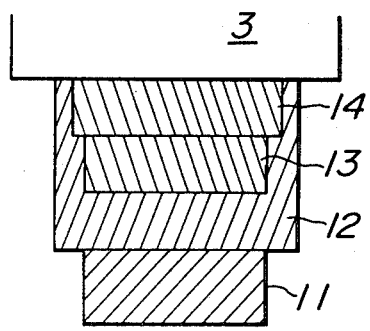
FIG. 2 is a schematic view when the belt zone in FIG. 1 is viewed from the tread surface side of the tire.

FIG. 1 shows a cross-section of a tire of the present invention and the numeral 1 shows a tread reinforcing layer, the numeral 2 shows a carcass, the numeral 3 shows a tread, the numerals 12 and 13 show main intersecting belts and the numerals 11 and 14 show inner and outer supplemental belts. FIG. 2 is a schematic view when the tread reinforcing layer 1 in FIG. 1 is exposed and viewed from the tread surface side.

When a test was made by comparing a tire of the belt structure of the present invention with a tire of a conventional belt structure, the superiority of the belt structure of the present invention can be proved by comparing with the conventional belt structure as follows.

Tire size: OR 18.00R 33 Tire for running on a rough ground.

Test number: 30 tires in each test group.

TABLE 1

|  |  | First belt | Second belt | Third belt | Fourth belt | Waste ratio due to cut (index) | Breakdown ratio of belt (index) |
|---|---|---|---|---|---|---|---|
| Conventional belt 1 | Elongation at breakage (index) | 100 | 100 | 100 | 100 | 100 | 100 |
|  | Angle of cords in belt (°) | 60 | 20 | 20 | 20 |  |  |
| Conventional belt 2 | Elongation at breakage (index) | 100 | 100 | 140 | 140 | 93 | 97 |
|  | Angle of cords in belt (°) | 25 | 25 | 25 | 25 |  |  |
| Belt in the present invention | Elongation at breakage (index) | 170 | 100 | 100 | 170 | 85 | 72 |
|  | Angle of cord in belt (°) | 42 | 23 | 18 | 25 |  |  |

Note:
In the above table, the order of the belts means the order from the inside of the tire toward the outside. Therefore, in the belt structure of the present invention, the second and third belts mean the main intersecting belts 12, 13 and the fourth belt means the outer supplemental belt 14 and the first belt means the inner supplemental belt 11.

As seen from the above table, the belt structure of the present invention is particularly suitable for radial tires for running on rough ground and shows the superior results in the cut resistance and belt breakdown resistance to the conventional belt structure.

What is claimed is:

1. In pneumatic radial tires for running on rough ground in which a carcass composed of at least one cord layer arranged in radial plane of the tire is surrounded with a tread reinforcing layer composed of a plurality of belts embedded in a crown portion of the tire, the improvement wherein, said tread reinforcing layer, comprises a pair of main intersecting belts having different belt widths in which cords are arranged to intersect with each other across an equator of the tire, and supplemental belts arranged inside and outside of said pair of main intersecting belts in the radial direction of the tire respectively in which cords have an elongation at breakage at least 40% larger than that of the cords of the main intersecting belts, and an angle of the cords in the belt having the smaller width in the main intersecting belts with respect to the above described equator is 2°–9° smaller than the angle of the cords in the belt having the larger width and an angle of the cords of the supplemental belt positioned between the main intersecting belts and the carcass ply is 35°–60°.

2. Pneumatic radial tires as claimed in claim 1, wherein the elongation at breakage of the cords in the supplemental belts is at least 70% larger than that in the main intersecting belts.

3. Pneumatic radial tires as claimed in claim 1, wherein the angle of the cords in the belt having the larger width in the main intersecting belts with respect to the equator is 15°–50°.

4. Pneumatic radial tires as claimed in claim 1, wherein the angle of the cords of the supplemental belt positioned between the main intersecting belts and the carcass ply with respect to the equator of the tire is 40°–50°.

* * * * *